(12) United States Patent
Nilsson et al.

(10) Patent No.: US 11,973,565 B2
(45) Date of Patent: Apr. 30, 2024

(54) CANDIDATE BEAM SELECTION FOR A TERMINAL DEVICE

(71) Applicant: Telefonaktiebolaget LM Ericsson (publ), Stockholm (SE)

(72) Inventors: Andreas Nilsson, Gothenburg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 59 days.

(21) Appl. No.: 17/783,192

(22) PCT Filed: Dec. 9, 2019

(86) PCT No.: PCT/EP2019/084207
§ 371 (c)(1),
(2) Date: Jun. 7, 2022

(87) PCT Pub. No.: WO2021/115551
PCT Pub. Date: Jun. 17, 2021

(65) Prior Publication Data
US 2023/0013213 A1    Jan. 19, 2023

(51) Int. Cl.
*H04B 7/02* (2018.01)
*H04B 7/06* (2006.01)
(Continued)

(52) U.S. Cl.
CPC .......... *H04B 7/088* (2013.01); *H04B 7/0695* (2013.01); *H04W 16/28* (2013.01)

(58) Field of Classification Search
CPC ...... H04B 7/088; H04B 7/0695; H04W 16/28
(Continued)

(56) References Cited

U.S. PATENT DOCUMENTS

2019/0007123 A1*  1/2019  Rune ................. H04W 36/0094
2019/0037530 A1   1/2019  Han et al.
(Continued)

FOREIGN PATENT DOCUMENTS

EP    3 293 890 A1    3/2018
EP    3 422 594 A1    1/2019

OTHER PUBLICATIONS

International Search Report and Written Opinion dated Apr. 9, 2020 in International Application No. PCT/EP2019/084207 (17 pages).
(Continued)

*Primary Examiner* — Helene E Tayong
(74) *Attorney, Agent, or Firm* — Rothwell, Figg, Ernst & Manbeck, P.C.

(57) ABSTRACT

There is provided mechanisms for rotational movement triggered candidate beam updating at a terminal device. A method is performed by the terminal device. The method comprises performing beamformed communication, in a first beam having a first pointing direction, with a transmission and reception point. The method comprises detecting that the terminal device is subjected to a rotational movement. The rotational movement causes the first beam to change its pointing direction. The method comprises updating, upon having detected that the terminal device is subjected to the rotational movement, a candidate set of second beams to be used for beam training. The candidate set of second beams, upon having been updated, comprises at least one second beam having a predefined pointing direction.

19 Claims, 5 Drawing Sheets

(51) Int. Cl.
*H04B 7/08* (2006.01)
*H04W 16/28* (2009.01)

(58) Field of Classification Search
USPC .......................................................... 375/267
See application file for complete search history.

(56) References Cited

U.S. PATENT DOCUMENTS

2019/0053213 A1* 2/2019 Stirling-Gallacher ......................
 H04L 5/0057
2019/0199407 A1* 6/2019 Tang ..................... H04L 5/0023
2019/0238202 A1 8/2019 Chavva et al.

OTHER PUBLICATIONS

International Preliminary Report on Patentability dated Feb. 25, 2022 in International Application No. PCT/EP2019/084207 (22 pages).

* cited by examiner

Fixed candiate beams

One candiate beam along horizontal plane (a)

(b)

(c)

Horizontal plane

CANDIDATE BEAM SELECTION FOR A TERMINAL DEVICE

CROSS REFERENCE TO RELATED APPLICATION(S)

This application is a 35 U.S.C. § 371 National Stage of International Patent Application No. PCT/EP2019/084207, filed Dec. 9, 2019.

TECHNICAL FIELD

Embodiments presented herein relate to a method, a terminal device, a computer program, and a computer program product for rotational movement triggered candidate beam updating at the terminal device.

BACKGROUND

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). One task of the beam management procedure is to discover and maintain beam pair links. A BPL (i.e. both the beam used by the network node and the beam used by the terminal device) is expected to be discovered and monitored by the network using measurements on downlink reference signals, such as channel state information reference signals (CSI-RS) or synchronization signal block (SSB) signals, used for beam management.

The CSI-RS for beam management can be transmitted periodically, semi-persistently or aperiodically (event triggered) and they can be either shared between multiple terminal devices or be device-specific. The SSB are transmitted periodically and are shared for all terminal devices. In order for the terminal device to find a suitable network node beam, the network node transmits the reference signal in different transmission (TX) beams on which the terminal device performs measurements, such as reference signal received power (RSRP), and reports back the M best TX beams (where M be configured by the network). Furthermore, the transmission of the reference signal on a given TX beam can be repeated to allow the terminal device to evaluate a suitable reception (RX) beam. Reference signals that are shared between all terminal devices served by the TRP might be used to determine a first coarse direction for the terminal devices. It could be suitable for such a periodic TX beam sweep at the TRP to use SSB as the reference signal. One reason for this is that SSB are anyway transmitted periodically (for initial access/synchronization purposes) and SSBs are also expected to be beamformed at higher frequencies to overcome the higher propagation losses noted above.

The term spatial quasi-location (QCL) commonly refers to a relationship between the antenna port(s) of two different downlink reference signals (RSs). If two transmitted downlink RSs are configured by the TRP, or network node, to be spatially QCL at the terminal device receiver, then the terminal device may assume that the first and second RSs are transmitted with approximately the same transmitter spatial filter configuration. Thus, the terminal device may use approximately the same receiver spatial filter configuration to receive the second reference signal as it used to receive the first reference signal. In this way, spatial QCL is a term that assists in the use of analog beamforming and formalizes the notion of same terminal device receive beam over different time instances.

While spatial QCL refers to a relationship between two different downlink RSs from a terminal device perspective, the term spatial relation to refer to a relationship between one uplink RS and another RS, which can be either a downlink RS or an uplink RS. This is also defined from a terminal device perspective. If the uplink RS is spatially related to a downlink RS, this means that the terminal device should transmit the uplink RS in the opposite direction from which it received the previous downlink RS. More precisely, the terminal device should apply the same transmitter spatial filtering configuration for the transmission of the second RS as the receiver spatial filtering configuration it previously used to receive the previous downlink RS. If instead the terminal device has transmitted an uplink RS, then the terminal device should apply the same transmit spatial filtering configuration for the transmission of the next uplink RS as the transmit spatial filtering configuration it used to transmit the previous RS.

Due to rotation (with respect to roll, pitch, and/or yaw) of the terminal device, the beams generated by the terminal device for transmission and reception of signals might be rapidly outdated. If the beam generated by the terminal device used for uplink transmission is based on the spatial relation from an earlier uplink beam sweep, the terminal device is not allowed to change the spatial filter weights of the analog antenna array to compensate for the rotation.

Hence, there is a need for improved beam management and/or beam training procedures.

SUMMARY

An object of embodiments herein is to enable efficient beam management and/or beam training of a terminal device subjected to a rotational movement.

According to a first aspect there is presented a method for rotational movement triggered candidate beam updating at a terminal device. The method is performed by the terminal device. The method comprises performing beamformed communication, in a first beam having a first pointing direction, with a transmission and reception point. The method comprises detecting that the terminal device is subjected to a rotational movement. The rotational movement causes the first beam to change its pointing direction. The method comprises updating, upon having detected that the terminal device is subjected to the rotational movement, a candidate set of second beams to be used for beam training. The candidate set of second beams, upon having been updated, comprises at least one second beam having a predefined pointing direction.

According to a second aspect there is presented a terminal device for rotational movement triggered candidate beam updating at the terminal device. The terminal device comprises processing circuitry. The processing circuitry is configured to cause the terminal device to perform beamformed communication, in a first beam having a first pointing direction, with a transmission and reception point. The processing circuitry is configured to cause the terminal device to detect that the terminal device is subjected to a rotational movement. The rotational movement causes the first beam to change its pointing direction. The processing circuitry is configured to cause the terminal device to update, upon having detected that the terminal device is subjected to the rotational movement, a candidate set of second beams to be used for beam training. The candidate set of second beams, upon having been updated, comprises at least one second beam having a predefined pointing direction.

According to a third aspect there is presented a terminal device for rotational movement triggered candidate beam updating at the terminal device. The terminal device comprises a communication module configured to perform beamformed communication, in a first beam having a first pointing direction, with a transmission and reception point. The terminal device comprises a detect module configured to detect that the terminal device is subjected to a rotational movement. The rotational movement causes the first beam to change its pointing direction. The terminal device comprises an update module configured to update, upon having detected that the terminal device is subjected to the rotational movement, a candidate set of second beams to be used for beam training. The candidate set of second beams, upon having been updated, comprises at least one second beam having a predefined pointing direction.

According to a fourth aspect there is presented a computer program for rotational movement triggered candidate beam updating at a terminal device, the computer program comprising computer program code which, when run on the terminal device, causes the terminal device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects enable efficient beam management and/or beam training of the terminal device when subjected to a rotational movement.

Advantageously, instead of using a fixed set of candidate beams for beam training and/or beam management procedures, the terminal device is enabled to adapts the set of candidate beams based on prior knowledge of for example, the horizontal plane, the amount of rotation, and/or previously suitable beams, which will improve the path gain.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
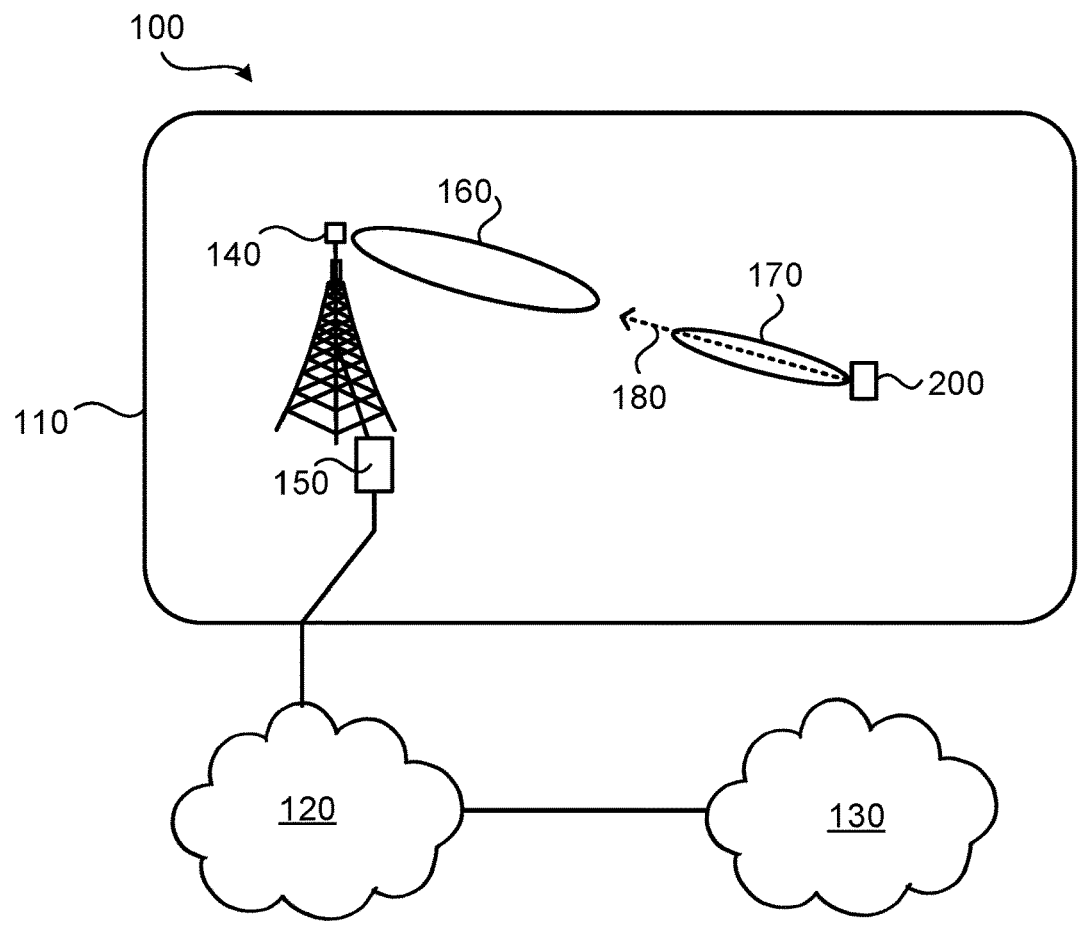
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) generation telecommunications network and support any 3GPP telecommunications standard, where applicable.

The communications network 100 comprises a network node 150 configured to provide network access to at least one terminal device 200 in a radio access network 110. The radio access network 110 is operatively connected to a core network 120. The core network 120 is in turn operatively connected to a service network 130, such as the Internet. The terminal device 200 is thereby enabled to, via the network node 150, access services of, and exchange data with, the service network 130.

The network node 150 comprises, is collocated with, is integrated with, or is in operational communications with, a transmission and reception point (TRP) 140. The network node 150 (via its TRP 140) and the terminal device 200 are configured to communicate with each other in beams. In the illustrative example of FIG. 1, beam 160 is the beam currently being used by the TRP 140 for communication with the terminal device 200, and beam 170 is the beam currently being used by the terminal device 200 for communication with the TRP 140. Beam 170 has a pointing direction 180.

Examples of network nodes 150 are radio access network nodes, radio base stations, base transceiver stations, Node Bs, evolved Node Bs, g NBs, access points, access nodes, and backhaul nodes. Examples of terminal devices 200 are wireless devices, mobile stations, mobile phones, handsets, wireless local loop phones, user equipment (UE), smartphones, laptop computers, tablet computers, network equipped sensors, network equipped vehicles, and so-called Internet of Things devices.

Figure 2:
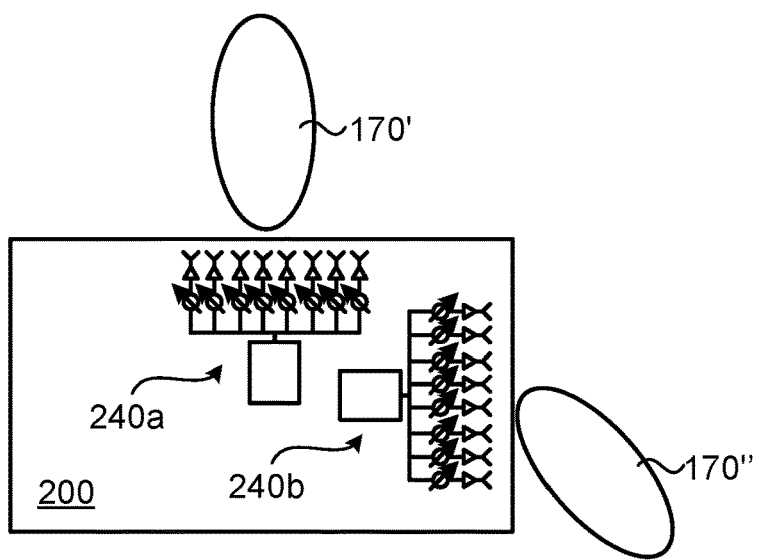
FIG. 2 schematically illustrates a terminal device and its antenna system according to an embodiment.

FIG. 2 is a schematic diagram of a terminal device 200 in general and in particular illustrates an example of an antenna system, in the form of two antenna panels 240a, 240b, as used by the terminal device 200 for generating one or more beams 170', 170". In some embodiments, the beams are generated by at least one antenna array in the terminal device 200. The antenna array is one-dimensional or two-dimensional. According to the illustrative example of FIG. 2, the two panels have orthogonal pointing directions with respect to each other in order to improve the coverage and increase the order of spatial multiplexing. In order to handle uplink beam management for such a terminal device 200 in an efficient manner (e.g., to minimize overhead), the TRP 140 might trigger the terminal device 200 to transmit one uplink reference signal resource set per panel simultaneously. This means that the terminal device 200 is enabled to perform multiple simultaneous uplink beam management procedures in parallel; one per panel 240a, 240b.

As noted above, there is a need for improved beam management and/or beam training procedures, and an object of embodiments herein is to enable efficient beam management and/or beam training of a terminal device 200 subjected to a rotational movement.

The embodiments disclosed herein relate to mechanisms for rotational movement triggered candidate beam updating at a terminal device 200. In order to obtain such mechanisms there is provided a terminal device 200, a method performed by the terminal device 200, a computer program product comprising code, for example in the form of a computer program, that when run on a terminal device 200, causes the terminal device 200 to perform the method.

Figure 3:
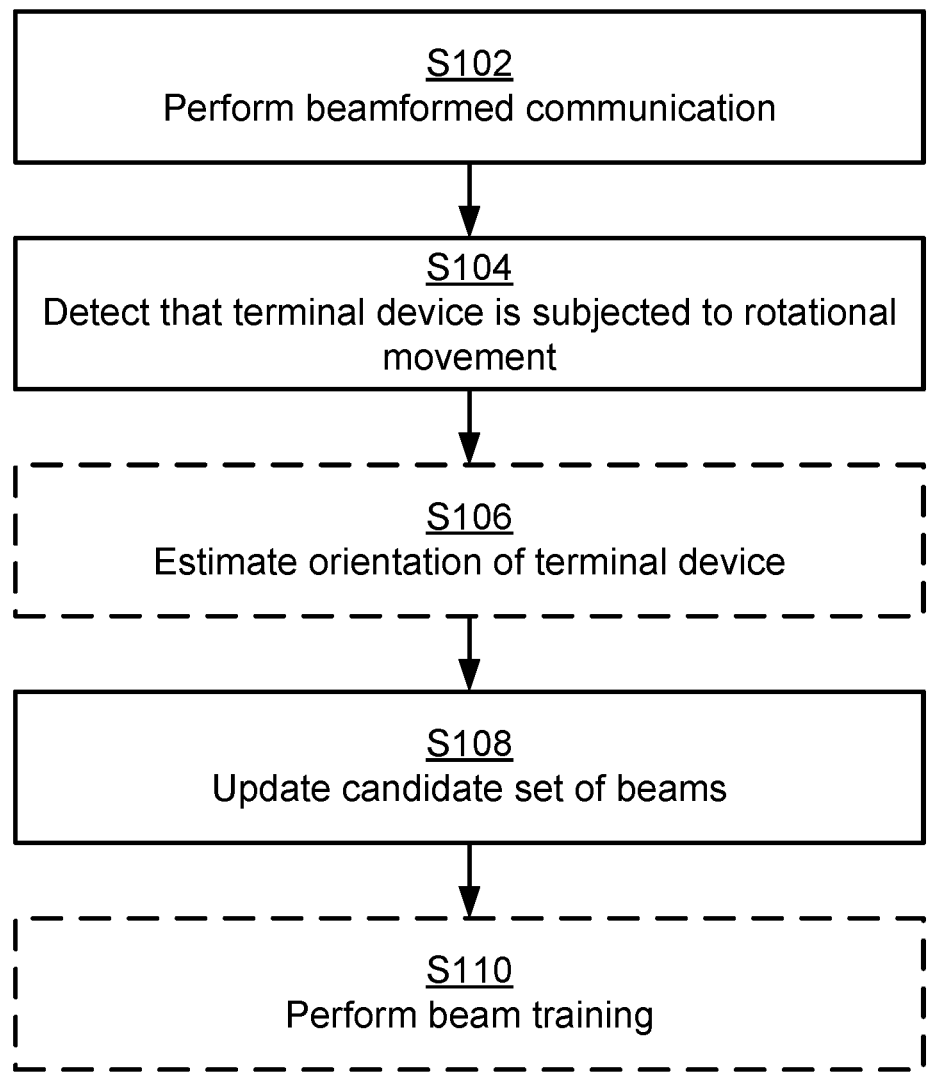
FIG. 3 is a flowchart of methods according to embodiments.

FIG. 3 is a flowchart illustrating embodiments of methods for rotational movement triggered candidate beam updating at a terminal device 200. The methods are performed by the terminal device 200. The methods are advantageously provided as computer programs 920.

It is assumed that the terminal device 200 is involved in beamformed communication with the transmission and reception point 140. In particular, the terminal device 200 is configured to perform step S102:

S102: The terminal device 200 performs beamformed communication, in a first beam 170 having a first pointing direction 180, with the transmission and reception point 140.

It is assumed that the terminal device 200 is rotated. That is, the terminal device 200 is configured to perform step S104:

S104: The terminal device 200 detects that the terminal device 200 is subjected to a rotational movement. The rotational movement causes the first beam 170 to change its pointing direction 180.

Upon rotation, the terminal device 200 updates its set of candidate beams for beam management based on the estimated rotation of the terminal device 200. Thus, the terminal device 200 is configured to perform step S108:

S108: The terminal device 200 updates, upon having detected that the terminal device 200 is subjected to the rotational movement, a candidate set of second beams 190a, 190b, 190c to be used for beam training. The candidate set of second beams 190a, 190b, 190c, upon having been updated, comprises at least one second beam having a predefined pointing direction.

Embodiments relating to further details of rotational movement triggered candidate beam updating at the terminal device 200 as performed by the terminal device 200 will now be disclosed.

In some aspects, the candidate set of second beams 190a, 190 b, 190 c are updated by having their antenna weights, in terms of gain and/or phase, adjusted.

In some aspects, in order for the terminal device 200 to correctly determine the predefined pointing direction, the terminal device 200 determines its spatial orientation at least with respect to the horizontal plane. That is, according to an embodiment, the terminal device 200 is configured to perform (optional) step S106:

S106: The terminal device 200 estimates spatial orientation of the terminal device 200 at least with respect to the horizontal plane.

In some aspects, in order for the terminal device 200 to correctly determine the predefined pointing direction, the terminal device 200 determines its spatial orientation with respect to roll, pitch, and/or yaw. The terminal device 200 might estimate its spatial orientation for example by using accelerometers, sensors, cameras, etc.

In some aspects, the terminal device 200 performs the beam training procedure during which the updated candidate set of second beams 190a, 190b, 190c is used. That is, according to an embodiment, the terminal device 200 is configured to perform (optional) step S110:

S110: The terminal device 200 performs the beam training procedure upon having updated the candidate set of second beams 190a, 190b, 190c. The beam training procedure involves the terminal device 200 to perform beamformed communication, in the candidate set of second beams 190a, 190b, 190c, with the transmission and reception point 140.

There could be different types of beam training performed by the terminal device 200 in S110. In some embodiments, the beam training procedure involves the terminal device 200 to transmit and/or receive reference signals in the candidate set of second beams 190a, 190b, 190c. In further embodiments, the beam training procedure involves the terminal device 200 to select one of the candidate set of second beams 190a, 190b, 190 c for continued communication with the transmission and reception point 140.

As will be disclosed next, there could be different examples of predefined pointing directions.

In some aspects, the terminal device 200 is configured to determine its angle with respect to the line of horizon and is further configured to, in the candidate set of second beams 190a, 190b, 190c, always have at least one beam pointing along the horizontal plane. Thus, in some embodiments, the predefined pointing direction is as horizontal as possible.

Figure 4:
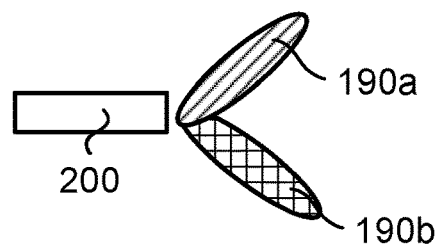
FIGS. 4, 5, and 6 schematically illustrates scenarios of candidate beam selection upon rotation of a terminal device according to embodiments.
Figure 4:
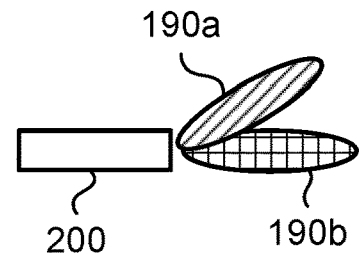
Figure 4:
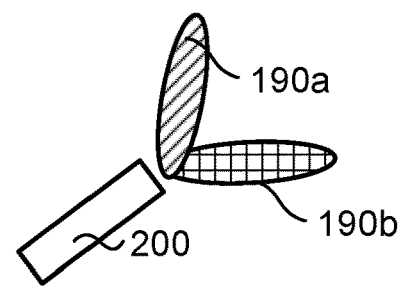
Figure 4:
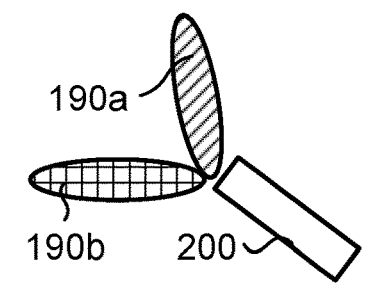
Figure 4:
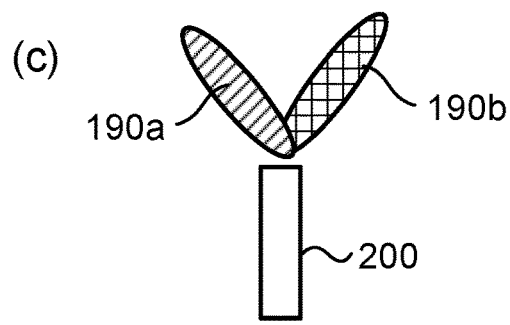
Figure 4:
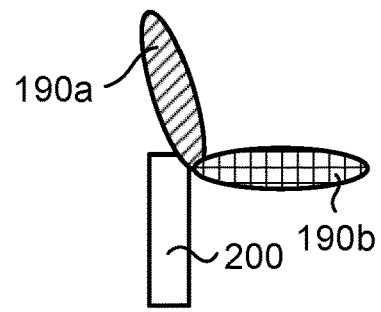
Figure 4:
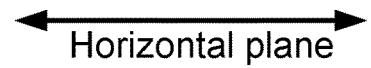

Intermediate reference is here made to FIG. 4. FIG. 4 illustrates in its left column at (a), (b), and (c) examples where the antenna weights for the candidate set of second beams 190a, 190b are fixed when the terminal device 200 is subjected to rotational movement. FIG. 4 illustrates in its right column at (a), (b), and (c) an embodiment where the terminal device 200 always has one beam 190 b pointing along the horizontal plane, by the antenna weights of candidate beams 190a, 190b, in terms of gain and/or phase, being adjusted as the terminal device 200 is subjected to rotational movement.

Further, since in some aspects it can be assumed that the transmission and reception point 140 is located vertically higher than the terminal device, the terminal device 200 might be configured to in the candidate set of second beams 190a, 190b, 190c, always have at least one beam with a vertically inclining pointing direction. In some embodiments, the predefined pointing direction thus has an angle of inclination with respect to the horizontal plane in the interval 30 to 60 degrees, preferably in the interval 40 to 50 degrees, more preferably being 45 degrees.

In some aspects, the terminal device 200 has previously determined that the first beam 170 having the first pointing direction 180 is the best beam for communication with the transmission and reception point 140 and is further configured to, in the candidate set of second beams 190a, 190b, 190c, always have at least one beam pointing in the same direction as the previously best beam. Thus, in some embodiments, the predefined pointing direction is as similar to the first pointing direction 180 as possible.

Figure 5:
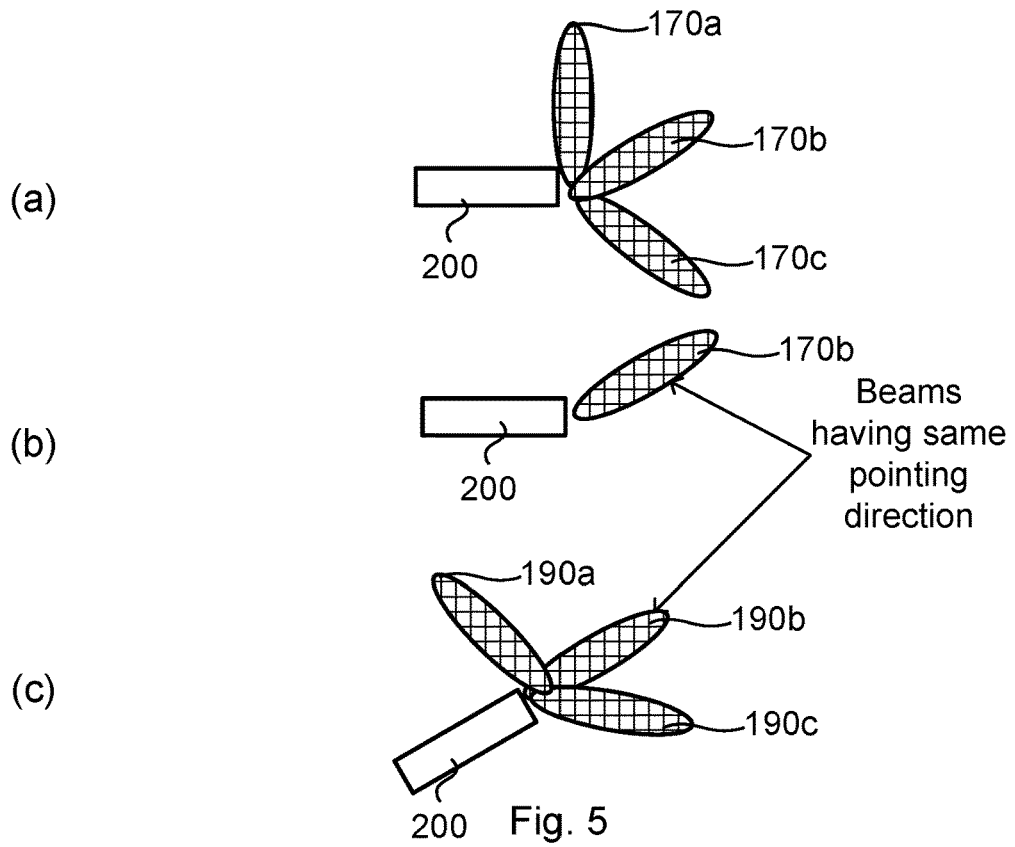

Intermediate reference is here made to FIG. 5. FIG. 5 illustrates an embodiment where the terminal device 200 always has one beam 190 b pointing in the same direction as the previously best beam. At (a) the terminal device 200 performs one or several beam sweep(s) in beams 170a, 170b, 170c in order for the best beam to be determined. This procedure might have been performed during some time to let the terminal device 200 find an optimal beam. At (b) the terminal device 200 uses the best beam found from (a), assumed for illustrative purposes to be beam 170b, for data communication with the transmission and reception point 140. The terminal device 200 is then subjected to rotational movement. At (c) the terminal device 200 updates the candidate set of second beams 190a, 190b, 190c such that at least one of the beams, assumed for illustrative purposes to be beam 190b, is pointing in the same direction as the previous best beam 170b.

In some aspects, the terminal device 200 has previously determined that the first beam 170 having the first pointing direction 180 is the best beam for communication with the transmission and reception point 140 and is further configured to, in the candidate set of second beams 190a, 190b, 190c, have beams with more dense angular distribution around the previously best beam. That is, the pointing directions of the candidate set of second beams 190a, 190b, 190c give rise to an angular distribution of pointing directions, and in some embodiments, the angular distribution is denser in, or at least as proximate as possible, the first pointing direction 180 than in any other pointing direction.

Figure 6:
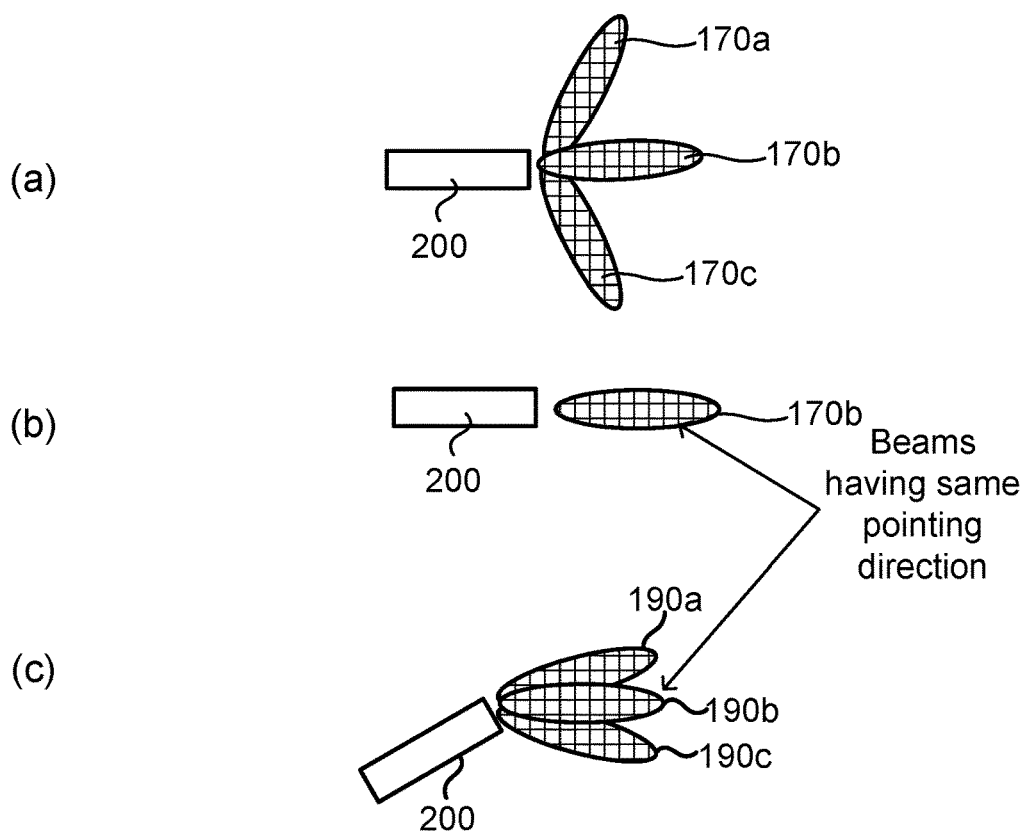

Intermediate reference is here made to FIG. 6. FIG. 6 illustrates an embodiment where the terminal device 200 always has more dense distribution of beams pointing in the same direction as the previously best beam. At (a) the terminal device 200 performs one or several beam sweep(s) in beams 170a, 170b, 170c in order for the best beam to be determined. This procedure might have been performed during some time to let the terminal device 200 find an optimal beam. At (b) the terminal device 200 uses the best beam found from (a), assumed for illustrative purposes to be beam 170b, for data communication with the transmission and reception point 140. The terminal device 200 is then subjected to rotational movement. At (c) the terminal device 200 updates the candidate set of second beams 190a, 190b, 190c such that the angular distribution of the candidate beams is denser in, or at least as proximate as possible, the same direction as the previous best beam 170b than in any other pointing direction.

In some aspects, the terminal device 200 is configured to prioritize the alternatives of always having at least one beam pointing in the same direction as the previously best beam (i.e., where the predefined pointing direction is as similar to the first pointing direction 180 as possible) and/or having beams with more dense angular distribution around the previously best beam (i.e., where the angular distribution of the candidate set of second beams 190a, 190b, 190c is denser in, or at least as proximate as possible, the first pointing direction 180 than in any other pointing direction) over the alternatives of always having at least one beam pointing along the horizontal plane (i.e., where the predefined pointing direction is as horizontal as possible) or always having at least one beam with a vertically inclining pointing direction (i.e., where the predefined pointing direction has an angle of inclination with respect to the horizontal plane as disclosed above).

However, which alternative to prioritize might depend on factors, such as amount of received power, whether or not the rotation is still ongoing or not, the speed of rotation, etc. For example, if the amount of received power is comparatively low, if the rotation is still ongoing, and/or if the speed of rotation is comparatively high, it might be preferred to always have at least one beam pointing along the horizontal plane (i.e., where the predefined pointing direction is as horizontal as possible) or always having at least one beam with a vertically inclining pointing direction (i.e., where the predefined pointing direction has an angle of inclination with respect to the horizontal plane as disclosed above). Further, the higher the rotational speed is, the wider the candidate set of second beams 190a, 190b, 190c might be. Further, the candidate set of second beams 190a, 190b, 190c might be selected such that the polarization state is kept.

In some aspects, two or more of the alternatives are combined. Hence, in some embodiments, there are, in the candidate set of second beams 190a, 190b, 190c, two or more second beams, each having its own predefined pointing direction. That is, as an example having at least one beam pointing in the same direction as the previously best beam (i.e., where the predefined pointing direction is as similar to the first pointing direction 180 as possible) is combined with having beams with more dense angular distribution around the previously best beam (i.e., where the angular distribution of the candidate set of second beams 190a, 190b, 190c is denser in, or at least as proximate as possible, the first pointing direction 180 than in any other pointing direction), and/or is combined with always having at least one beam pointing along the horizontal plane (i.e., where the predefined pointing direction is as horizontal as possible), and/or is combined with always having at least one beam with a vertically inclining pointing direction (i.e., where the predefined pointing direction has an angle of inclination with respect to the horizontal plane as disclosed above). Also other combination of the alternatives are possible.

The herein disclosed embodiments are applicable for both uplink communication and downlink communication between the terminal device 200 and the transmission and reception point 140. The herein disclosed embodiments are thus applicable for both beam training and beam management in uplink as well as for beam training and beam management in downlink. That is, both when the terminal device 200 should receive downlink reference signals (such as channel state information reference signals (CSI-RS) or synchronization signal block (SSB) signals) in different candidate beams or when the UE should transmit uplink references signals (such as sounding reference signals (SRS)) in different candidate beams.

In case the terminal device 200 has a two-dimensional antenna array, the herein disclosed embodiments are applicable in both dimensions in the same way.

Figure 7:
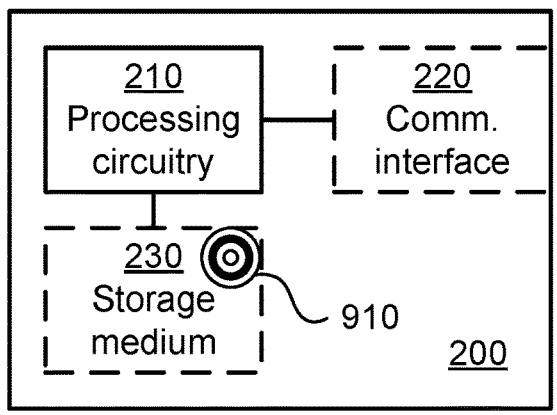
FIG. 7 is a schematic diagram showing functional units of a terminal device according to an embodiment.

FIG. 7 schematically illustrates, in terms of a number of functional units, the components of a terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200 to perform a set of operations, or steps, as disclosed above. For example, the storage medium 230 may store the set of operations, and the processing circuitry 210 may be configured to retrieve the set of operations from the storage medium 230 to cause the terminal device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The terminal device 200 may further comprise a communications interface 220 at least configured for communications with the transmission and reception point 140. As such the communications interface 220 may comprise one or more transmitters and receivers, comprising analogue and digital components. The communications interface 220 might comprise the antenna panels 240a, 240b.

The processing circuitry 210 controls the general operation of the terminal device 200 e.g. by sending data and control signals to the communications interface 220 and the storage medium 230, by receiving data and reports from the communications interface 220, and by retrieving data and instructions from the storage medium 230. Other components, as well as the related functionality, of the terminal device 200 are omitted in order not to obscure the concepts presented herein.

Figure 8:
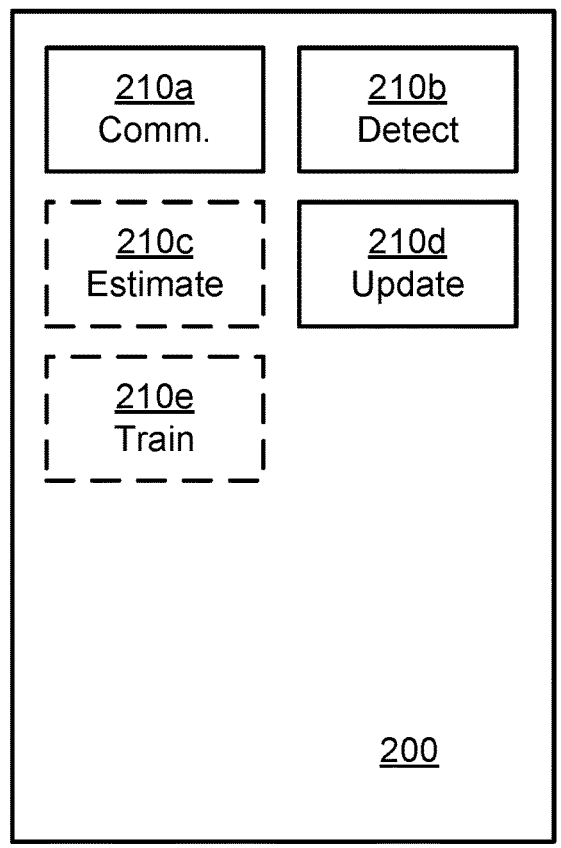
FIG. 8 is a schematic diagram showing functional modules of a terminal device according to an embodiment.

FIG. 8 schematically illustrates, in terms of a number of functional modules, the components of a terminal device 200 according to an embodiment. The terminal device 200 of FIG. 8 comprises a number of functional modules; a communication module 210a configured to perform step S102, a detect module 210b configured to perform step S104, and an update module 210d configured to perform step S108. The terminal device 200 of FIG. 8 may further comprise a number of optional functional modules, such as any of an estimate module 210C configured to perform step S106, and a train module 210e configured to perform step S110. In general terms, each functional module 210a-210e may in one embodiment be implemented only in hardware and in another embodiment with the help of software, i.e., the latter embodiment having computer program instructions stored on the storage medium 230 which when run on the processing circuitry makes the terminal device 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

Examples of terminal devices 200 have been provided above with reference to the description of FIG. 1.

Figure 9:
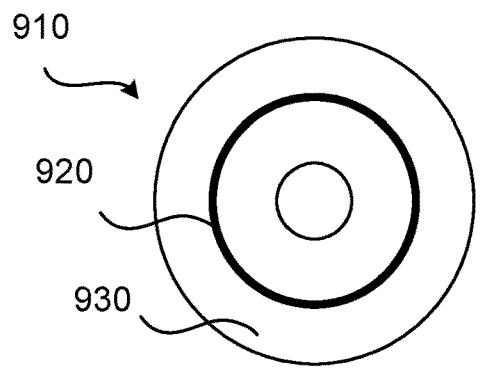
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for rotational movement triggered candidate beam updating at a terminal device, the method being performed by the terminal device, the method comprising:
   performing beamformed communication, in a first beam having a first pointing direction, with a transmission and reception point;
   detecting that the terminal device is subjected to a rotational movement, the rotational movement causing the first beam to change its pointing direction; and
   updating, after having detected that the terminal device is subjected to the rotational movement, a set of candidate beams to be used in a beam training procedure, wherein the set of candidate beams, after having been updated, comprises a second beam having a predefined pointing direction, wherein
   the predefined pointing direction is substantially horizontal.

2. The method of claim 1, wherein
   the set of candidate beams further comprises a third beam having a third pointing direction, and
   the third pointing direction has an angle of inclination with respect a horizontal plane in the interval 30 to 60 degrees.

3. The method of claim 1, wherein the predefined pointing direction is similar to the first pointing direction.

4. The method of claim 1, wherein
the pointing directions of the candidate beams included in the set of candidate beams give rise to an angular distribution of pointing directions, and
the angular distribution is denser in the first pointing direction than in any other pointing direction.

5. The method of claim 1, further comprising:
estimating a spatial orientation of the terminal device with respect to a horizontal plane.

6. The method of claim 1, further comprising:
performing the beam training procedure after having updated the set of candidate beams, wherein
the beam training procedure comprises the terminal device performing beamformed communication with the transmission and reception point using the candidate beams included in the set of candidate beams.

7. The method according to claim 6, wherein the beam training procedure comprises the terminal device transmitting and/or receiving reference signals using the candidate beams included in the set of candidate beams.

8. The method according to claim 6, wherein the beam training procedure comprises the terminal device selecting one of the candidate beams included in the set of candidate beams for continued communication with the transmission and reception point.

9. The method of claim 1, wherein the first and second beams are generated by at least one antenna array in the terminal device, and wherein the antenna array is one-dimensional or two-dimensional.

10. A terminal device for rotational movement triggered candidate beam updating at the terminal device, the terminal device comprising processing circuitry, the processing circuitry being configured to cause the terminal device to:
perform beamformed communication, in a first beam having a first pointing direction, with a transmission and reception point;
detect that the terminal device is subjected to a rotational movement, the rotational movement causing the first beam to change its pointing direction; and
update, after having detected that the terminal device is subjected to the rotational movement, a set of candidate beams to be used in a beam training procedure, wherein the set of candidate beams, after having been updated, comprises a second beam having a predefined pointing direction, wherein
the predefined pointing direction is substantially horizontal.

11. The terminal device according to claim 10, wherein
the set of candidate beams further comprises a third beam having a third pointing direction, and
the third pointing direction has an angle of inclination with respect a horizontal plane in the interval 30 to 60 degrees.

12. The terminal device of claim 10, wherein the predefined pointing direction is similar to the first pointing direction.

13. The terminal device of claim 10, wherein
the pointing directions of the set of candidate beams give rise to an angular distribution of pointing directions, and
the angular distribution is denser in the first pointing direction than in any other pointing direction.

14. The terminal device of claim 10, wherein the processing circuitry is further configured to cause the terminal device to:
estimate a spatial orientation of the terminal device with respect to a horizontal plane.

15. The terminal device of claim 10, wherein the processing circuitry is further configured to cause the terminal device to:
perform the beam training procedure after having updated the set of candidate beams, wherein
the beam training procedure comprises the terminal device performing beamformed communication with the transmission and reception point using the candidate beams included in the set of candidate beams.

16. The terminal device according to claim 15, wherein the beam training procedure comprises the terminal device transmitting and/or receiving reference signals using the candidate beams included in the set of candidate beams.

17. The terminal device according to claim 16, wherein the beam training procedure comprises the terminal device selecting one of the candidate beams included in the set of candidate beams for continued communication with the transmission and reception point.

18. The terminal device of claim 10, wherein
the first and second beams are generated by at least one antenna array in the terminal device, and
the antenna array is one-dimensional or two-dimensional.

19. A non-transitory computer readable medium storing a computer program for rotational movement triggered candidate beam updating at a terminal device, the computer program comprising computer code which, when run on processing circuitry of the terminal device, causes the terminal device to:
perform beamformed communication, in a first beam having a first pointing direction, with a transmission and reception point;
detect that the terminal device is subjected to a rotational movement, the rotational movement causing the first beam to change its pointing direction; and
update, after having detected that the terminal device is subjected to the rotational movement, a set of candidate beams to be used in a beam training procedure, wherein the set of candidate beams, after having been updated, comprises at least one second beam having a predefined pointing direction, wherein
the predefined pointing direction is substantially horizontal.

* * * * *